US007136047B2

(12) United States Patent
Shimada et al.

(10) Patent No.: US 7,136,047 B2
(45) Date of Patent: Nov. 14, 2006

(54) SOFTWARE MULTI-TAP INPUT SYSTEM AND METHOD

(75) Inventors: Tetsurou Shimada, Kanagawa-ken (JP); Kenji Furuuchi, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 10/410,008

(22) Filed: Apr. 9, 2003

(65) Prior Publication Data

US 2004/0201576 A1 Oct. 14, 2004

(51) Int. Cl.
*G09G 5/00* (2006.01)
*H03M 11/00* (2006.01)

(52) U.S. Cl. .................. 345/168; 345/173; 341/23; 715/864

(58) Field of Classification Search ........ 345/168–173; 715/773, 864; 341/22–24, 28
See application file for complete search history.

(56) References Cited

U.S. PATENT DOCUMENTS

| 5,006,001 | A | * | 4/1991 | Vulcano .................. 400/486 |
| 5,559,512 | A | * | 9/1996 | Jasinski et al. ............. 341/22 |
| 5,956,021 | A | * | 9/1999 | Kubota et al. ............. 341/179 |
| 6,271,835 | B1 | * | 8/2001 | Hoeksma .................. 345/168 |
| 6,529,187 | B1 | * | 3/2003 | Dickelman ................ 345/169 |
| 6,741,235 | B1 | * | 5/2004 | Goren ...................... 345/173 |
| 2001/0026274 | A1 | * | 10/2001 | Saruwatari ............... 345/467 |

FOREIGN PATENT DOCUMENTS

| JP | 07200120 A | * | 8/1995 |
| JP | 2000339550 A | * | 12/2000 |
| KR | 1020010090470 A | * | 10/2001 |

OTHER PUBLICATIONS

McKenzie, I. Scott, et al., "Letter Wise: Prefix-based Disambiguation for Mobil Text Input" In Proceedings of the ACM Symposium on User Interface Software and Technology, UIST 2001, pp. 111-120, New York: ACM, retrieved document from http://www.yorku.ca/mack/uist01.html p. 1 of 18 (Mar. 6, 2003).
Caseyporn/projects/textinput/better predictive text, retrieved document from http://projects.caseyporn.com/textinput/pospred.php. p. 1 of 2 (Mar. 6, 2003).
Sendo Ships First Product in the Netherlands, New player offers lightest GSM phone in the world, *New press room*, retrieved from http://www.sendo.com/news/newsitem.asp?ID=49 p. 1 of 2 (Mar. 6, 2003).

* cited by examiner

*Primary Examiner*—Alexander Eisen
(74) *Attorney, Agent, or Firm*—Westman, Champlin & Kelly, P.A.

(57) ABSTRACT

A software multi-tap input method requires only two taps to input most characters. This is especially beneficial for languages where existing multi-tap methods require on average more than two strokes per character, and where handwriting recognition is currently an unacceptable alternative. The described system employs a touch-screen input that contains a selection of displayed "buttons" substantially fewer in number than the number of potential characters in the language of interest. An input area contains an array of symbols, each symbol being associated with a group of candidate characters. A candidate area contains an array of characters associated with a most recently selected group symbol in the input area. To select a particular character, a user pushes a group symbol in the input area and then selects the desired character in the candidate area.

19 Claims, 15 Drawing Sheets

| かな | Esc | わ | ら | や | ま | は | な | た | さ | か | あ | ° | ←BS |
|---|---|---|---|---|---|---|---|---|---|---|---|---|---|
| カナ | → | を | り | ▓ | み | ひ | に | ち | し | き | い | ˝ | ←→ |
| 小字 | · | ん | る | ゆ | む | ふ | ぬ | つ | す | く | う | ー | 空白 |
| 半角 | ( | 「 | れ | ▓ | め | へ | ね | て | せ | け | え | × | ↵ |
| 記号 | ) | 」 | ろ | よ | も | ほ | の | と | そ | こ | お | 。 | 変換 |

| | | 513 515 | 507 |
|---|---|---|---|
| 511 → | 1 | ABC | (A,B,C) |
| | 2 | DEF | (D,E,F) |
| | 3 | GHI | (G,H,I) |
| | 4 | JKL | (J,K,L) |
| | 5 | MNO | (M,N,O) |
| | 6 | PQR | (P,Q,R) |
| | 7 | STU | (S,T,U) |
| | 8 | VW | (V,W) |
| | 9 | XYZ | (X,Y,Z) |
| | 0 | @./: | (@,.,/,) |
| | * | *[]<> | (*,[],<>) |
| | # | #!?% | (#!?%) |

| ESC |  | あ | か | さ | BS |
| 文字 |  | た | な | は | 空白 |
| 大/小 |  | ま | や | ら | ENT |
| → |  | ?! | わ | ゛ | 変換 |

*FIG. 6A*

| ESC | あ | か | さ | | BS |
|-----|---|---|---|---|-----|
| 文字 | た | な | は | | 空白 |
| 大/小 | ま | や | ら | | ENT |
| → | ?! | わ | ゛゜ | | 変換 |

SOFTWARE MULTI-TAP INPUT SYSTEM AND METHOD

FIELD OF THE INVENTION

This invention relates generally to electronic device input systems and, more particularly, relates to a system and method for multi-tap input via a device display.

BACKGROUND

As computing and communication devices shrink in size and increase in mobility and popularity, there arises a greater need to provide user-friendly input methods that require a minimal amount of user time and effort to actuate. Many devices, such as certain cell-phones, have a hardware keyboard or keypad, through which the user may input information. Other devices have touch screens to allow user input. In some cases, a combination of input methods may be supplied.

With respect to devices that are too small to practically support a full keyboard in the appropriate language, a number of input techniques have been devised. Primary examples include a multi-tap hardware input method as well as a number of predictive methods. The multi-tap hardware method may be easily understood by considering a typical cell phone having a display-only screen (i.e. not touch screen) and 12 data entry buttons (0–9, * and #). Most buttons are assigned to a certain sequence of letters etc. For example, a typical phone, cell phone or otherwise, has at least the following key assignments: 2 (a,b,c), 3 (d,e,f), 4 (g,h,i), 5 (j,k,l), 6 (m,n,o), 7 (p,q,r,s), 8 (t,u,v), 9 (w,x,y,z), 0 (space).

In order to input a letter via such an array of buttons, such as during input of a word, the user typically pushes a particular button one or more times. Thus, to enter the word "phone" the user pushes the following sequence of buttons: 7, 4 (×2), 6 (×3), 6(×2), 3(×2). Note that the buttons usually cycle, and thus pushing "6" five times in a row would yield a single letter, n. Thus, to enter consecutive letters using the same button, the user must either wait for a time out to occur after arriving at the candidate for the first letter before moving on to entry of the second letter via the same button, or must push a "determine" key between the entry sequences. As will be appreciated, this input method can result in an undesirably high number of strikes for each character actually entered. Indeed, some in the art have noted that the average number of keystrokes per character using the multi-tap method is slightly greater than two for English. For other languages with greater numbers of characters or elements, the number of keystrokes per character can be much higher depending upon the actual number of entry buttons relative to the number of possible characters.

The predictive methods mentioned above attempt to lower the number of keystrokes per character by predictively finishing the input for the user. Typically, predictive techniques present a scrollable assortment of possible words that the user may be trying to spell, with the most probable choices listed higher in the list. The user selects the appropriate choice by scrolling if necessary and selecting, rather than finishing the letter-by-letter input. However, an erroneous user resolution of an ambiguity can take significant input time and keystrokes to correct, and the device may not know the particular word that the user is trying to write depending upon its dictionary size and source.

A related technique is referred to as disambiguation, because although a single multi-assigned keystroke may be ambiguous, multiple keystrokes can generally be resolved, or disambiguated, to a specific intended word with reasonable probability. In this technique, a user hits each multi-assigned button only once during sequence entry, and the device decides, after several characters, or after entry ends, which word or word portion in a stored database fits the input sequence. If multiple words or word portions in the database fit the sequence, then the user must select from among the possibilities. While this technique may work reasonably well with respect to English, it is impractical to implement in many other languages. Moreover, this technique shares certain drawbacks with the predictive techniques in that an erroneous user resolution of an ambiguity can take significant input time and keystrokes to correct.

Other input mechanisms include handwriting recognition, such as from a stylus entry pad or otherwise. However, the rate for correct recognition is fairly low for English implementations, and recognition rates in other languages are even worse. For example, handwritten Japanese characters are extremely difficult to correctly recognize, and an incorrect recognition consumes time and effort to correct.

BRIEF SUMMARY OF THE INVENTION

Embodiments of the invention solve the problems inherent in prior small device input methods by providing a software multi-tap input method that typically requires only two taps to input most characters. This is especially useful for languages such as Japanese, where existing multi-tap methods require many more strokes per character, and where handwriting recognition is currently an unacceptable alternative.

The method disclosed herein utilizes a touch-screen input that is responsive preferably to finger input, but is possibly additionally or alternatively responsive to mechanical input, such as via a stylus or other object usable to actuate the screen. The touch screen contains a selection of displayed "buttons" substantially fewer in number than the number of potential characters in the language of interest. For example, in Japanese Hiragana and Katakana, there are 51 phonetic characters. In an embodiment, these 51 characters are grouped into 10 groups, with additional groups provided for punctuation and other marks or characters. Each group contains up to five elements.

In an embodiment of the invention, the display for the device of interest, be it a cell phone, PDA, or other device, has two primary areas. A first area, sometimes referred to herein as the "input area," contains an array of symbols, each associated with a group of several characters. A second area, sometimes referred to herein as the "candidate area," contains an array of the characters associated with the most recently selected group symbol in the input area. Thus both areas are able to accept touch input, and at least the candidate area, and preferably the input area as well, is comprised of an adaptive display rather than a fixed display. To select a particular character, a user simply pushes the appropriate group symbol in the input area, at which point the relevant group of characters is displayed in the candidate area. Subsequently, the user directly selects the desired character in the candidate area.

It will be appreciated that the present invention allows the buttons used to input characters to be much larger than they would typically need to be if each character were to be constantly displayed on the screen for selection. The large buttons makes selection by finger easier and more accurate, increasing user convenience. At the same time, this two-tap method provides a time and effort savings over prior multitap techniques wherein substantially more taps per character were required on average. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2B is diagrammatic representation of a traditional all Kana keyboard entry interface;

FIG. 5B is an illustration of a chart conveying input key assignments to character candidate groups according to an embodiment of the invention adapted for the input of characters in an alphabetical mode;

FIG. 6A is a diagrammatic representation of a multitap keyboard entry interface mechanism according to an embodiment of the invention adapted for left-handed user input;

FIG. 6B is a diagrammatic representation of a multitap keyboard entry interface mechanism according to an embodiment of the invention adapted for right-handed user input;

DETAILED DESCRIPTION

Embodiments of the invention preferably operate in a small mobile device. However, the invention is more widely applicable to many device types such as a cell phones, hand-held devices, lap top computers, wireless surveillance devices, microprocessor-based or programmable consumer electronics, multi-processor systems, network PCs, minicomputers, mainframe computers, and the like, although any other device type, wired or wireless, that is capable of touch-screen input may be used to implement the invention as well.

Although not required, the invention will be described in the general context of computer-executable instructions, such as program modules, being executed by an electronic device. Generally, program modules include routines, programs, objects, components, data structures, etc. that perform particular tasks or implement particular abstract data types. In embodiments, the invention may be practiced in distributed computing environments where tasks are performed by remote processing devices that are linked through a communications network. In a distributed computing environment, program modules may be located in both local and remote memory storage devices.

Figure 1:
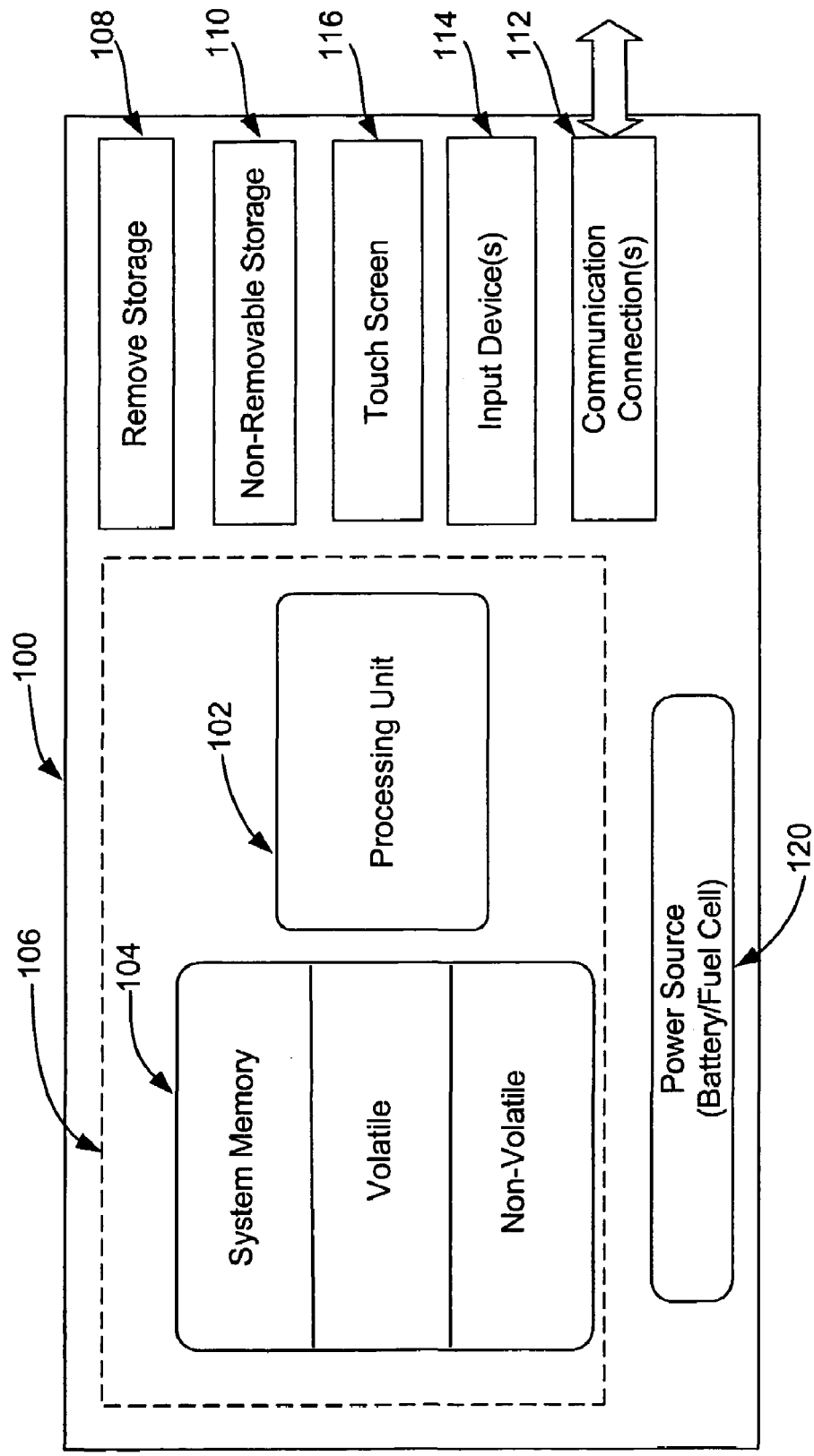
FIG. 1 is a block diagram generally illustrating an exemplary device architecture in which embodiments of the present invention may be implemented.

FIG. 1 shows an exemplary device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 112 that allow the device to communicate with other devices. In an embodiment of the invention, the device 100 is a cell phone or other mobile wireless device, whose primary communications connection is via wireless transmission and receipt of radio frequency (RF) radiation. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 preferably has a touch screen input and display 116 that is actuatable by a user's finger. The device 100 may also have one or other more input devices 114 such as a keyboard, mouse, pen, voice input device, etc. The device 100 may also have one or more other output devices such as speakers, a printer, a vibration generator, etc. All these devices are well known in the art and need not be discussed at greater length here. The device 100 can be provided with a portable power source 120, such as a battery pack, a fuel cell, or the like. The power source 120 provides power for computations, display, communications and so forth by the device 100.

In the description that follows, the invention will be described with reference to acts and symbolic representations of operations that are performed by one or more devices, unless indicated otherwise. As such, it will be understood that such acts and operations, which are at times referred to as being computer-executed, include the manipulation by the processing unit of the device of electrical signals representing data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2A:
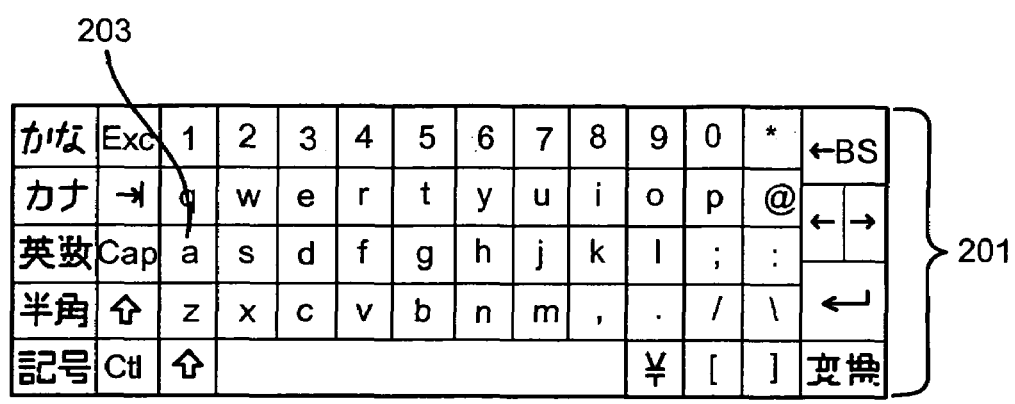
FIG. 2A is diagrammatic representation of a traditional "qwerty" keyboard entry interface.
Figure 2C:
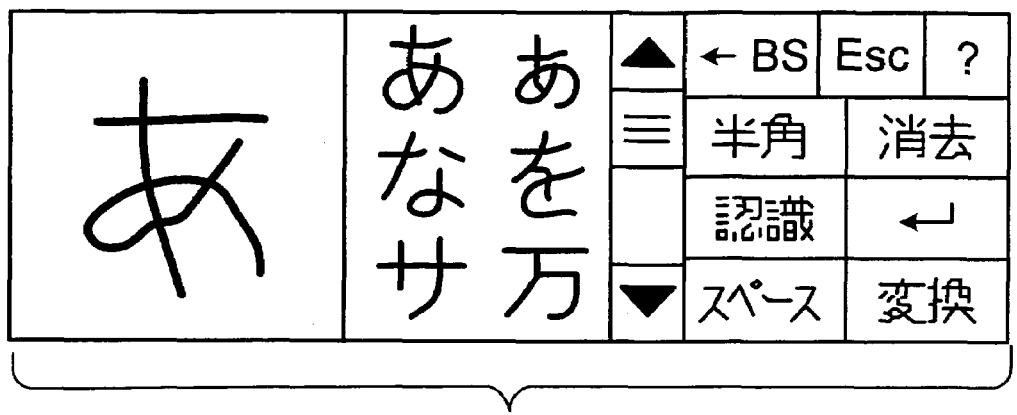
FIG. 2C is diagrammatic representation of two traditional handwriting recognition entry interfaces.
Figure 2C:

Turning to FIG. 2, examples of prior input methods are shown in schematic form. FIG. 2A schematically represents a traditional "qwerty" keyboard 201 that may be supplied on a device either in a hardware form or via a displayed "virtual" keyboard. In order to select a character from such a board, the user simply pushes the appropriate button such as button 203 representing the letter "a." However, the buttons in the keyboard 201 need to be relatively small, especially on a device with a small display, due to the great number of buttons that must be simultaneously displayed. Thus, a user has greater difficulty in using such a keyboard 201, being required to either use a fingernail or a stylus or some similar instrument for input. Moreover, the amount of device display space taken precludes the simultaneous display of as much other material as might otherwise be desired. If a "qwerty" hardware keyboard is used, not only does the device potentially increase in physical complexity and weight, but also a cost is incurred to acquire or make the hardware keyboard and to integrate it into the device.

Another type of known input array is shown in FIG. 2B. In particular, FIG. 2B represents an all Kana keyboard 205 that also may be supplied in hardware form or via a displayed keyboard. This type of keyboard 205, useful primarily on Japanese devices such as Japanese pagers and cell phones, has many of the same shortcomings as the "qwerty" keyboard 201. In particular, the buttons are difficult to actuate and take up more space than is necessary. Moreover, a hardware all Kana keyboard 205 has similar drawbacks to those mentioned for the hardware "qwerty" keyboard 201 in terms of cost and complexity.

Finally, a selection of handwriting recognition input mechanisms are illustrated schematically in FIG. 2C. In particular, display 207 shows a CAC handwriting recognition input mechanism, while display 209 shows a Multibox handwriting recognition input mechanism. However, each such method has inherent drawbacks as discussed above, including low recognition rates and difficulty in correcting incorrect resolutions of characters, as well as potentially decreased entry speed due to the need to carefully and slowly execute each figure. Moreover, such mechanisms require an input articulator such as a stylus, and typically cannot be finger actuated. The need for additional equipment complicates the user experience and increases the risk that necessary equipment will be lost or misplaced.

Figure 3:
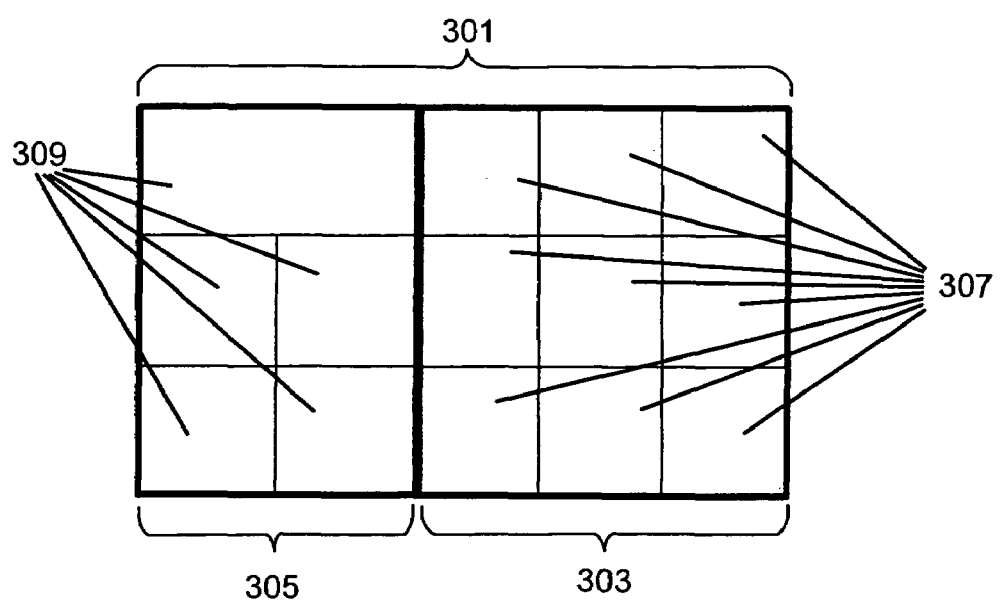
FIG. 3 is generalized diagrammatic representation of a multitap keyboard entry interface mechanism according to an embodiment of the invention.

FIG. 3 shows schematically a touch-screen input display 301 according to an embodiment of the invention solving the shortcomings inherent in the prior input methods. The touch-screen input display 301 according to this embodiment comprises an input area 303 and a candidate area 305. The input area 303 comprises a number of keys 307, each which is mapped to or associated with a group of characters. The candidate area 305 comprises a number of keys 309, each corresponding to a character of the group of characters associated with the most recently pushed key in the input area 303. Thus, actuation of a key in the input area 303 results in display in the candidate area 305 of the plurality of characters associated with that key. At this point, the user can then directly actuate the button in the candidate area 305 corresponding to the desired character. Thus, no more than two taps are typically required to enter a particular character, and as discussed below, fewer taps may be used in certain embodiments.

As will be discussed in greater detail with respect to subsequent figures, the display 301 may comprise some or all of a number of other buttons for character entry as well. Such other buttons include a button for causing an input mode change, a button for canceling the input operation, a button for changing character case, and a button for signaling or causing completion of a character input. Other buttons may include buttons for data entry commands such as space, back space, enter, etc., as well as one or more buttons for language manipulations such as character conversion, etc.

FIG. 4 illustrates a number of potential layouts for the input display 301 in greater detail. In particular, FIG. 4A illustrates a touch-screen input display 401 according to an embodiment of the invention wherein the display is adapted for the input of Japanese Hiragana, FIG. 4B illustrates a touch-screen input display 421 according to an embodiment of the invention wherein the display is adapted for the input of Japanese Katakana, FIG. 4C illustrates a touch-screen input display 441 according to an embodiment of the invention wherein the display is adapted for input via the alphabet, and FIG. 4D illustrates a touch-screen input display 461 according to an embodiment of the invention wherein the display is adapted for the input of numbers. Any particular mechanism for switching among display modes is not critical but will be discussed below.

It can be seen that the various input display areas 401, 421, 441, 461 share a number of features, such as an input area 403, 423, 443, 463 and a candidate area 405, 425, 445, 465 as discussed above. Also shown are buttons for escape 407, 427, 447, 467, backspace 409, 429, 449, 469, input mode change 411, 431, 451, 471, case change 413, 433, 453, 473, determine 415, 435, 455, 475, convert 417, 437, 457, 477, enter 419, 439, 459, 479, and space 420, 440, 460, 480.

The buttons shown are merely exemplary, and these areas and the particular buttons chosen for display in these or other areas are not critical to the invention.

Figure 4A:
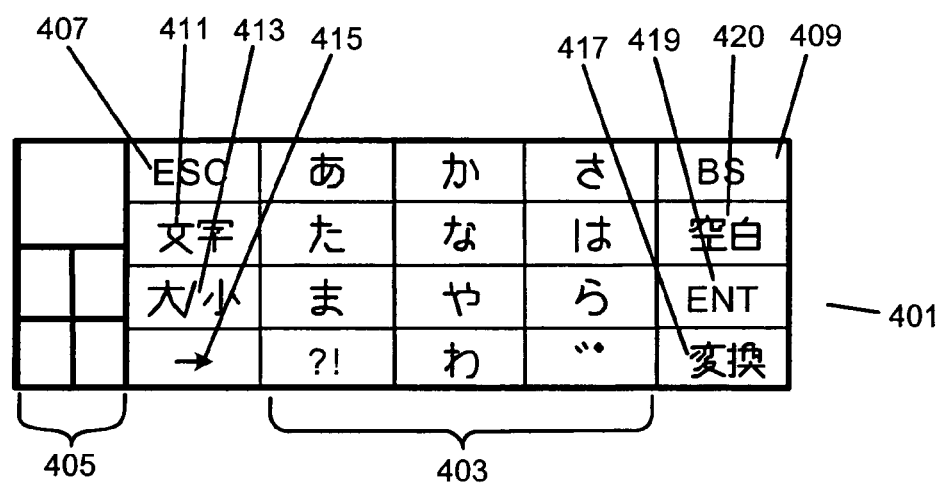
FIG. 4A is a diagrammatic representation of a multitap keyboard entry interface mechanism according to an embodiment of the invention adapted for the input of Japanese Hiragana.
Figure 4B:
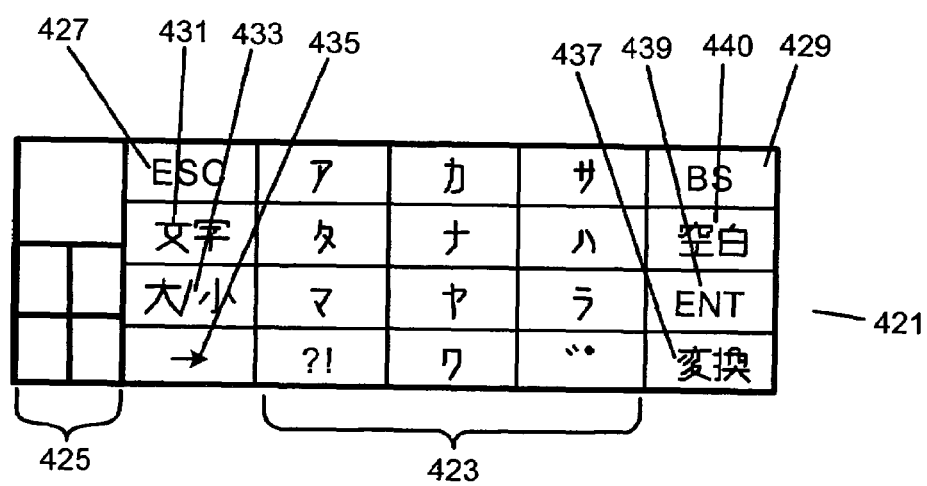
FIG. 4B is a diagrammatic representation of a multitap keyboard entry interface mechanism according to an embodiment of the invention adapted for the input of Japanese Katakana.
Figure 4C:
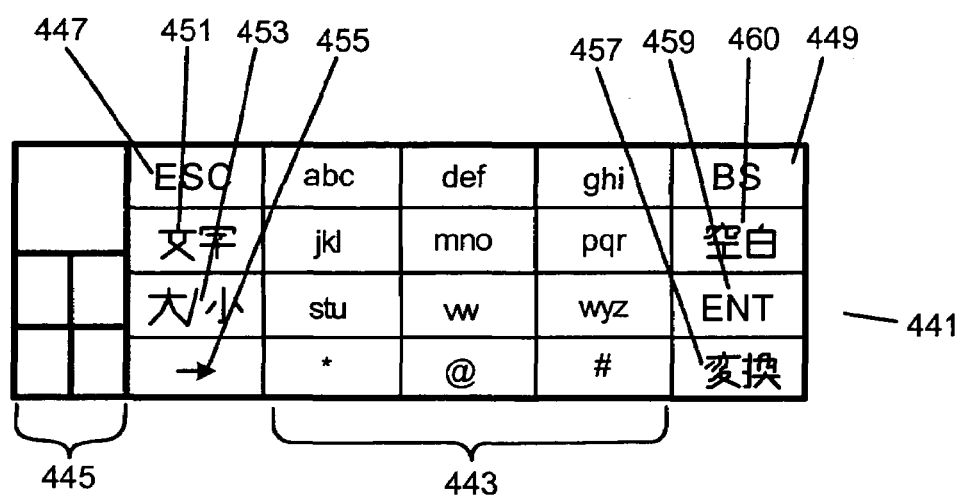
FIG. 4C is a diagrammatic representation of a multitap keyboard entry interface mechanism according to an embodiment of the invention adapted for input via the English alphabet.
Figure 4D:
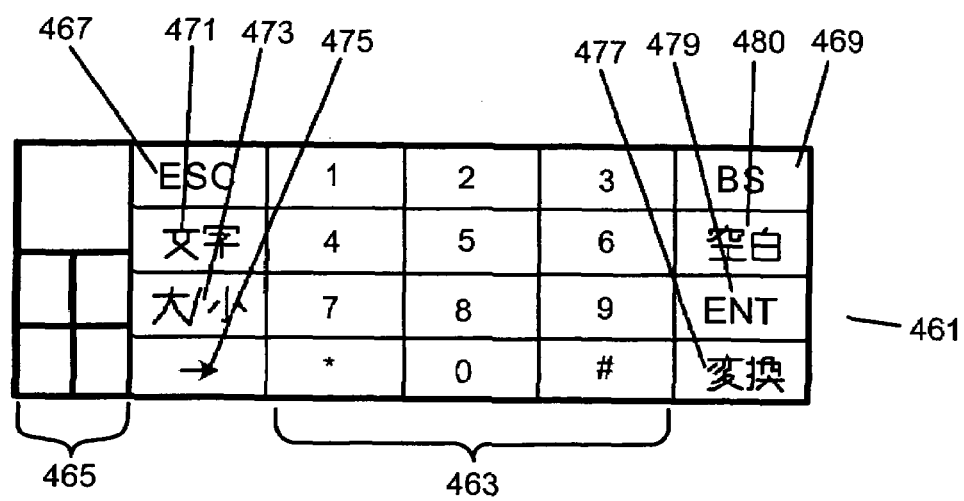
FIG. 4D is a diagrammatic representation of a multitap keyboard entry interface mechanism according to an embodiment of the invention adapted for the input of numbers.
Figure 5A:
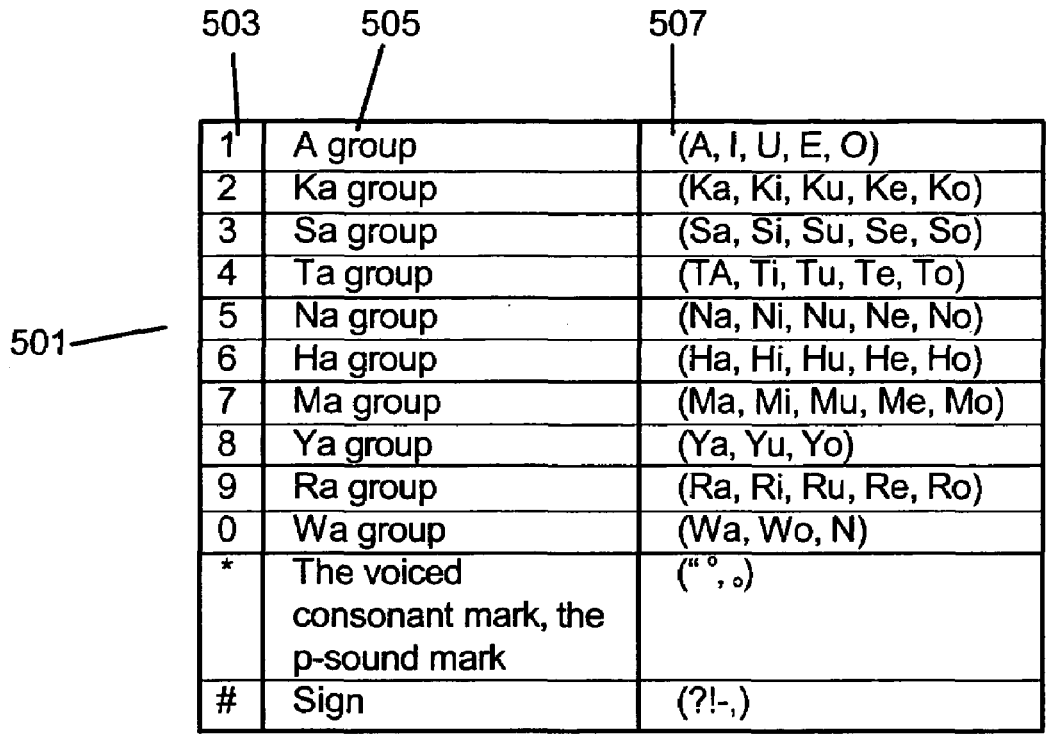
FIG. 5A is an illustration of a chart conveying input key assignments to character candidate groups according to an embodiment of the invention adapted for the input of characters in Full/Half width Kana mode.

The exact association of characters to input keys is not critical, but exemplary associations for Full/Half width Kana mode as well as alphabet mode are shown in FIGS. 5A and B respectively. Each of FIGS. 5A and B contains a chart 501, 511 having an input key column 503, 513 (keys are numbered for convenience, but displayed key face may show any appropriate character or symbol as shown in FIGS. 4A–D), a group column 505, 515, and a group member column 507, 517. The number in the input key column 503, 513 represents which key in the input area is being referenced. The identifier in the group column 505, 515 indicates the identity of the group of characters associated with the relevant key. Finally, the listing in the group member column 507, 517 indicates the members of the group identified in the group column 505, 515.

Thus, it can be seen that for an embodiment of a Full/Half width Kana mode, the following associations hold, listed as key number/group/group members: 1/A group/(A, I, U, E, O), 2/Ka group/(Ka, Ki, Ku, Ke, Ko), 3/Sa group/(Sa, Si, Su, Se, So), 4/Ta group/(Ta, Ti, Tu, Te, To), 5/Na group/(Na, Ni, Nu, Ne, No), 6/Ha group/(Ha, Hi, Hu, He, Ho), 7/Ma group/(Ma, Mi, Mu, Me, Mo), 8/Ya group/(Ya, Yu, Yo), 9/Ra group/(Ra, Ri, Ru, Re, Ro), 0/Wa group/(Wa, Wo, N), */the voiced consonant mark, the p-sound mark/("°, ₀"), and #/Sign/(?!–.). For the first ten groups, the group members represent phonetic characters or sounds. Such characters may be represented in any language including English and Japanese. In Japanese Hiragana and Katakana, there are 51 phonetic characters.

An example of using this input method is as follows. To input the word "iitenki" ("good weather") the user would push the "A" key in the input area once, and then select the "I" key in the candidate area once to input an "i." Then the user would repeat the sequence above to enter another "i." Note that the use need not wait for a timeout to expire or push a "determine" key between the "i" entry sequences since selection of a key in the candidate area acts to determine the end of the entry according to an embodiment of the invention. Next the user would push the "TA" input key and select the "te" candidate key, push the "WA" input key and select the "n" candidate key, and push the "KA" input key and select the "ki" candidate key.

To select the case of each character, the user can push a case selection key such as key 413 of FIG. 4A. Preferably, candidates display in the candidate area in a default case, and actuation of the case selection key toggles the default case for the ongoing and future entries, although any other case selection key or mechanism may alternatively be used.

In an embodiment of the alphabet mode, the following associations hold: 1/ABC/(A,B,C), 2/DEF/(D,E,F), 3/GHI/(G,H,I), 4/JKL/(J,K,L), 5/MNO/(M,N,O), 6/PQR/(P,Q,R), 7/STU/(S,T,U), 8/VW/(V,W), 9/XYZ/(X,Y,Z), 0/@./:/ (@./:), */*[]<>/(*[]<>), and #/#!?%/(#!?%). An example of input using input keys having these associations is as follows. To enter the word "cool," the user would push the "ABC" key in the input area once, and then select the "c" key in the candidate area once to input a "c." Next the user would push the "MNO" input key and select the "o" candidate key to input an "o" and then repeat those pushes to input another "o." Finally the user would push the "JKL" input key and select the "l" candidate key.

In an embodiment of the invention, when a user pushes an input key in the input area and subsequently pushes the same key in the input area instead of a key in the candidate area, the displayed candidates are rotated so that the second candidate associated with the pressed input key is now displayed in the primary location (i.e. in the largest box) in the candidate area. A subsequent push of the same input key rotates the third candidate into the primary position, and so forth.

Note that a time out may be used rather than a subsequent selection of a candidate or input key to finalize selection of a character. For example, in an embodiment, when a user presses an input key and then waits for a predetermined time out period such as one second, the first candidate of the group associated with the selected input key will be entered and the character string display advanced to the next character position to await further input. Thus, in this embodiment, using the example of the text string "apple" as discussed above, if the user ended the input sequence by waiting for the timeout after pressing "DEF" instead of continuing on to select the candidate "e," the character string would instead read "appld." The "d," which is the first candidate associated with the "DEF" input key, would have been automatically selected. A "right" or "determine" key such as key 415 of FIG. 4A may serve the same function of causing a resolution of the current character, usually to a first candidate in the current candidate area display.

In a further embodiment, the candidate area is not cleared after entry of a first candidate and may be used to type in subsequent characters in the same candidate group. Thus, to input the string "a,b,c," the user would press the "ABC" input key and then would sequentially press "a," "b," and "c" in the candidate area.

Figure 6A:
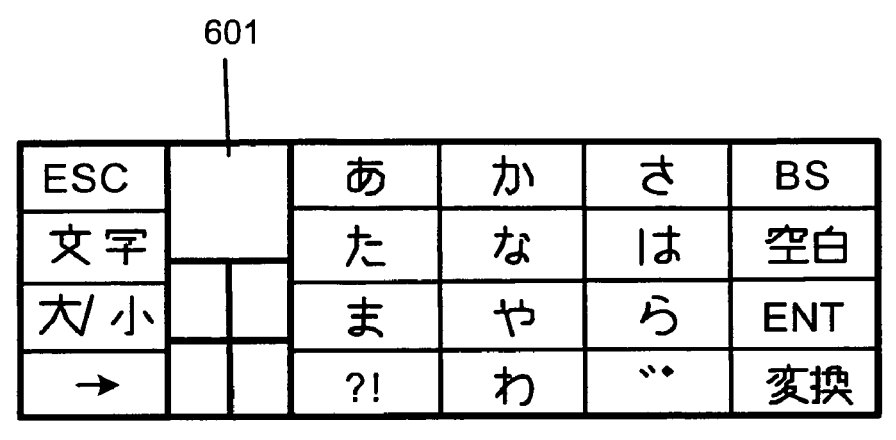
Figure 6B:
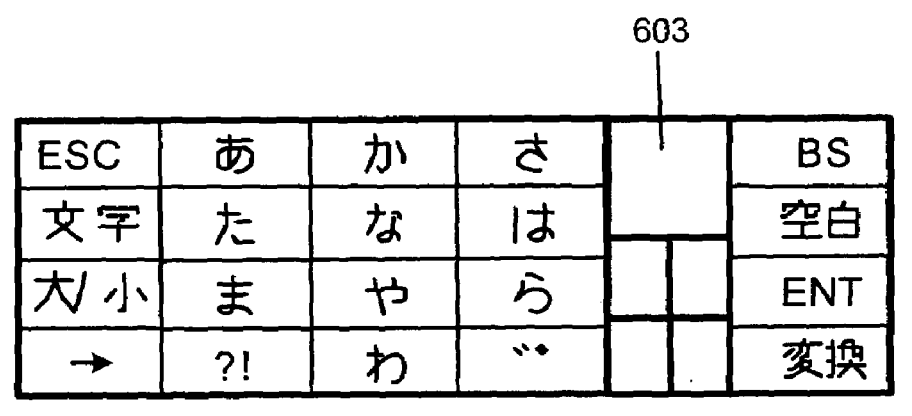

The described input mechanisms are easily adapted to conform for left-handed use or right-handed use according to embodiments of the invention. FIGS. 6A and B show displays adapted for left-handed use and right-handed use respectively. Note that the candidate area 601, 603 is placed on the right side of the display for right-handed use and the left side for left-handed use, easing the user's selection of candidates.

Although the input and candidate areas have been described by reference to a touch-screen input mechanism it is not critical that both areas be rendered via a touch screen. For example, it is contemplated that in some embodiments the input area keys will be hardware keys with only the candidate area being rendered via the touch screen. In such embodiments, although the mode of the input keys may be changed, such as between numerical, alphabetical, Japanese Hiragana, and Japanese Katakana modes, the change will not be reflected in the appearance of the input keys themselves. However, the candidates displayed as a result of pushing an input key will typically depend upon the current input mode. Note that in numerical mode, it is typically not required that any candidates be displayed after pushing an input key, since each input key will typically only be associated with one number. However, in an alternative embodiment of the numerical mode, the group of characters associated with an input key may be a group of numbers rather than a single number, so that for example, large numbers (numbers greater than the number of input keys associated with numbers) may be entered with fewer key strokes, etc.

Figure 7:
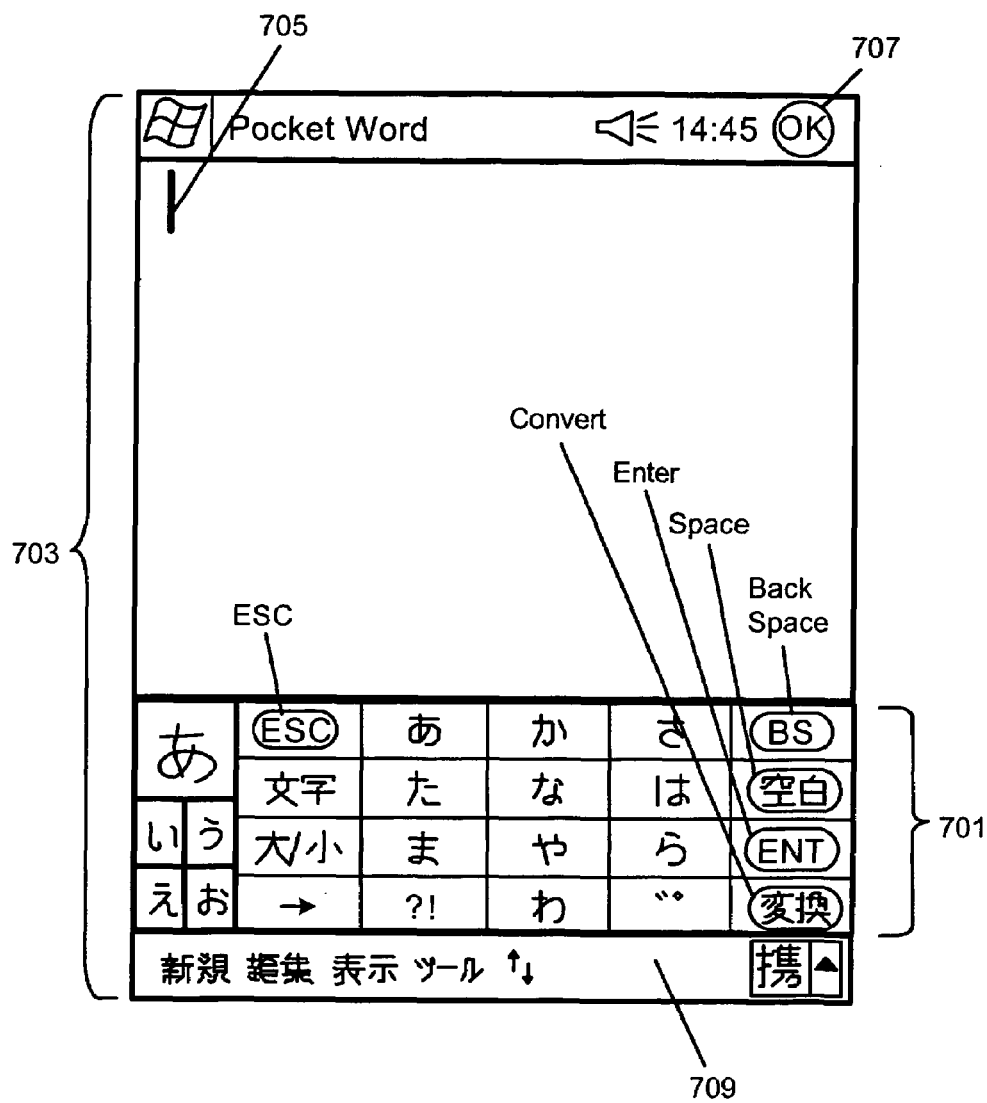
FIG. 7 illustrates an exemplary multitap keyboard entry interface according to an embodiment of the invention within a total user interface including an entered character string location.

FIG. 7 shows the display input screen 701 as part of a larger device display 703. Typically, entered characters appear in a character string display sequence at the cursor 705 in the same or similar manner as when one is inputting characters in a word processing application. Note that the display 703 can have, but is not required to have, many attributes of a typical user interface window including a title bar 707, a menu and/or task bar 709, etc. depending upon the application or operating system used to create the display.

Figure 8:
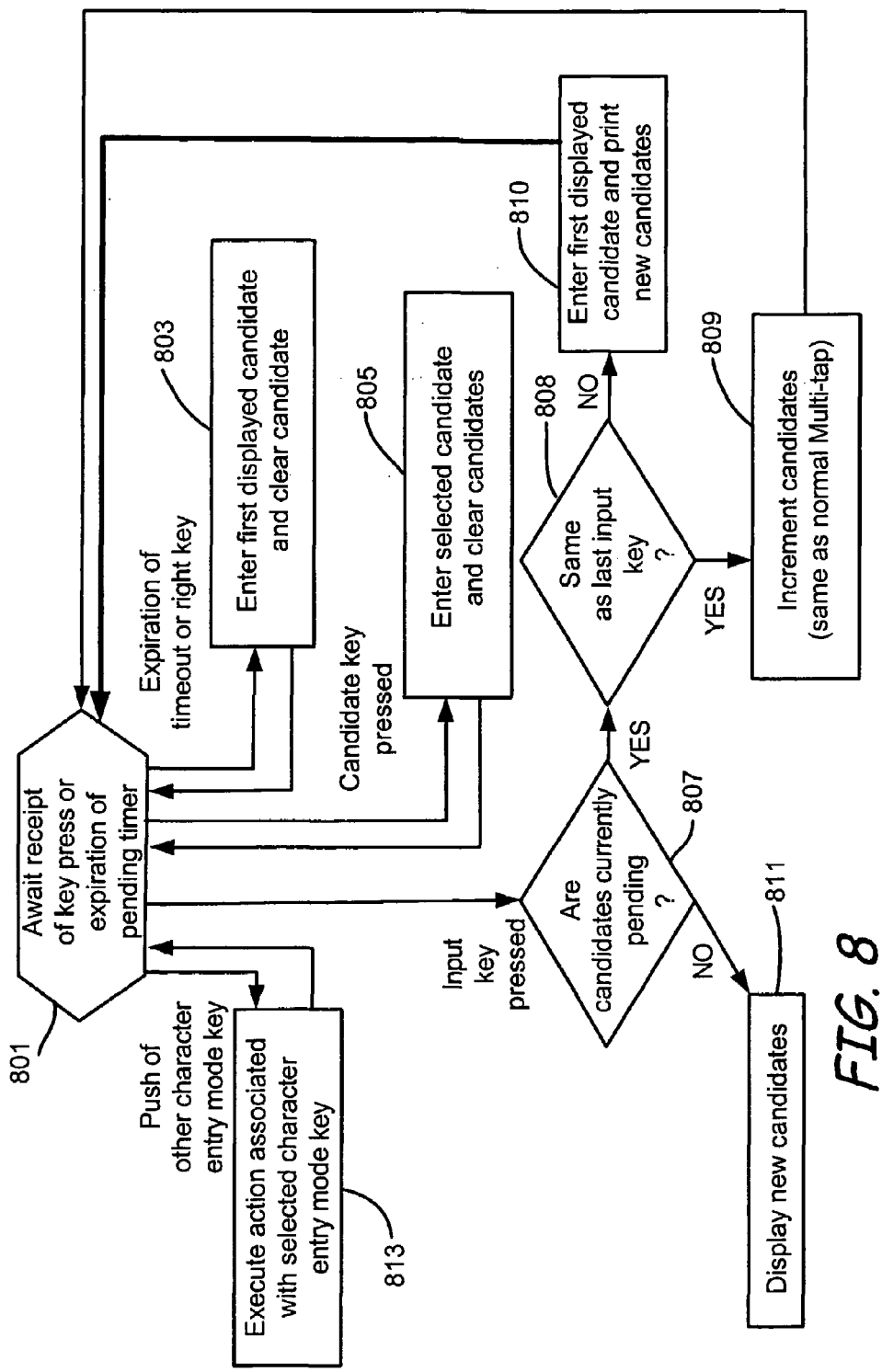
FIG. 8 is a flow chart showing steps taken to receive and process user input to a multitap keyboard entry interface mechanism according to an embodiment of the invention.

FIG. 8 shows a flow chart illustrating the steps taken by a device incorporating an embodiment of the invention to receive and process user input for typing a character string. At step 801, the device is in a character entry mode (i.e. an input area is displayed and a candidate area may or may not yet be displayed and if displayed may or may not yet have entries within it) and awaits user input or other action such as expiration of a timeout. In an initial character entry mode, the input keys, if rendered rather than hardware, preferably visually correspond to a default mode (such as Japanese Hiragana) or, in an embodiment, to the mode last used. In the latter embodiment, the mode last used may be the mode that was last used if the device has continuously remained powered on since that last use, or, if nonvolatile memory is provided, may be the mode that was last used regardless of whether the device has continuously remained powered on since that last use.

Subsequently a trigger event occurs causing progression from step 801 to another step. In this embodiment, the trigger event is either a press of a key or expiration of a time out. If the trigger event is the expiration of a timeout or press of the determine key, the process flows to step 803, whereat the first displayed candidate is entered and the candidate area cleared, after which the process returns to step 801. As discussed, typically a timeout expiration occurs after a key in the input area has been previously pressed and no other key is then pressed before expiration of a predetermined period of time such as one second. The predetermined period of time need not be one second and may be more or less depending for example upon user or manufacturer preference.

If the trigger event is a press of a candidate key then the process flows to step 805, whereat the selected candidate is entered and the candidate area cleared, after which the process returns to step 801. As discussed, a press of a candidate key may follow either a press of an input key or a press of a candidate key depending upon the embodiment implemented.

If the trigger event is a press of an input key, then the process flows to step 807. At step 807, it is determined whether candidates are currently pending, e.g. whether a previous event was also a press of a key in the input area. If candidates are currently pending, then at step 808, it is determined whether the pushed input key is the same as an immediately previously pushed input key. If it is determined at step 808 that the pushed input key is the same as an immediately previously pushed input key, then at step 809, the candidate area is incremented to the next candidate associated with that input key as discussed above, in the same manner as in normal multi-tap, and the process returns to step 801.

If however, it is determined at step 808 that the pushed input key is not the same as the immediately previously pushed input key, then at step 810, the first displayed candidate is entered, the new candidates associated with the pushed input key are displayed, and the process returns to step 801. If at step 807 it is instead determined that there are no candidates currently pending, then at step 811 the candidate display is conformed to the group of characters associated with the pressed input key and the process returns to step 801.

If the trigger event is the push of a character entry mode key other than an input key or a candidate key, then the process flows to step 813. At step 813, the action associated with the selected character entry mode key is executed. Subsequently, the process returns to step 801. As discussed above, character entry mode keys other than input keys and candidate keys include for example keys for escape, backspace, input mode change, case change, determine, convert, enter, and space commands, as well as additional or alternative keys.

It will be appreciated that a novel multitap input method has been described herein, including primarily a hardware or touch screen input key area as well as a touch screen candidate key area. Certain embodiments allow significant advantages over the prior art, although it is not required that each embodiment attain such advantages. One advantage attainable in many embodiments depending upon designer preference is the ability to use generally larger buttons for many character entry functions than would otherwise be usable for a non-multitap input method with respect to the same device size or screen size. As discussed, larger buttons tend to improve the user input speed and convenience since they are easier to manipulate. Another advantage attainable in embodiments is the ability of a user to enter characters using generally fewer strokes on average than would be used to input the same characters using other multi-tap input methods.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Moreover, although the invention improves over prior art input methods, it is not intended to limit the invention to exclusive use of the described embodiments without use of other input methods as well. For example, predictive techniques applied to prior input methods may be used as well with embodiments of the invention in the same manner that they are applied to other input methods. Therefore, the invention as described herein contemplates all such embodiments as may come within the scope of the following claims and equivalents thereof.

All of the references cited herein, including patents, patent applications, and publications, are hereby incorporated in their entireties by reference, with no part of any such reference being excluded from incorporation herein.

We claim:

1. A method for facilitating user input of a character to an electronic device having a touch screen display, the method comprising:

displaying in a graphical user interface on the display an input area within which a plurality of user-selectable input keys are persistently displayed, each input key including a respective candidate character group, each candidate character group comprising at least two visibly displayed candidate characters; and displaying in the graphical user interface a candidate area comprising a group of user-selectable candidate character keys, each candidate character key being correlated to a candidate in a current candidate character group, whereby user selection of an input key in the input area causes the characters of the candidate character group associated with the selected input key to be displayed in the candidate area on respective candidate character keys, and whereby user selection of a candidate character key causes entry in the electronic device of the character associated with the selected candidate character key.

2. The method according to claim 1, wherein entry in the electronic device of the character associated with the selected candidate character key comprises displaying the character at a current position on an entry line in the graphical user interface and incrementing the current position to a subsequent position on the entry line.

3. The method according to claim 1, further comprising displaying a mode change key in the graphical user interface, whereby selection of the mode change key cause a modification of the respective candidate character groups associated with a plurality of input keys.

4. The method according to claim 3, wherein the modification of the respective candidate character groups associated with a plurality of input keys comprises disassociating respective first candidate character groups from the plurality of input keys and associating respective second candidate character groups with the plurality of input keys.

5. The method according to claim 4, wherein each of the first candidate character groups corresponds to a first language and each of the second candidate character groups corresponds to a second language.

6. The method according to claim 5, wherein the first language and the second language are the same language.

7. The method according to claim 1, further comprising setting a time pursuant to a user-selection of a selected input key and upon expiration of the time without occurrence of a further user selection of an input or candidate key, causing entry in the electronic device of the first character in the respective candidate character group associated with the selected input key.

8. The method according to claim 1, wherein user selection of a first input key followed by user selection of a second input key different from the first input key causes entry in the electronic device of the first character in the candidate character group associated with the first input key and display in the candidate area of the candidate character group associated with the second input key.

9. A computer-readable medium having thereon computer-executable instructions for performing the method according to claim 1.

10. The method according to claim 1, wherein the electronic device is selected from the group comprising a cell phone, a personal digital assistant, and a mobile computer.

11. A mobile device comprising a touch screen for display of information and receipt of user input, wherein the touch screen comprises a display of a first area within which a plurality of user-selectable group keys are displayed, each group key including a respective character group, each character group comprising at least two visibly displayed characters, and a second area comprising a group of user-selectable character keys, each character key being correlated to a character in a character group, whereby user selection of a group key in the first area causes the characters of the character group associated with the selected group key to be displayed in the second area on respective character keys, and whereby user selection of a character key causes entry in the electronic device of the character associated with the selected character key.

12. A method for receiving and processing user input of a character corresponding to a selected language to an electronic device having a hard-key keyboard and a graphical user interface comprising a touch screen display, wherein the hard-key keyboard comprises substantially fewer keys for character entry than the number of characters in the selected language, each key being associated with a character group comprising at least one character in the selected language, the method comprising:

receiving a user selection of a particular key on the keyboard;

displaying on the touch screen display a group of individually user-selectable characters corresponding to the character group associated with the selected particular key;

receiving a user selection of a particular user-selectable character on the touch screen display;

causing entry in the electronic device of the selected particular character; and displaying a mode change key in the graphical user interface, whereby selection of the mode change key causes a modification of the respective character groups associated with a plurality of keys of the keyboard, wherein the modification of the respective character groups associated with a plurality of keys of the keyboard comprises disassociating respective first character groups from the plurality of keys of the keyboard and associating respective second character groups with the plurality of keys of the keyboard, and wherein each of the first character groups corresponds to a first language and each of the second character groups corresponds to a second language.

13. The method according to claim 12, wherein entry in the electronic device of the selected particular character comprises displaying the character at a current position on an entry line on the graphical user interface and incrementing the current position to a subsequent position on the entry line.

14. The method according to claim 12, wherein the hard-key keyboard further comprises a mode change key, whereby selection of the mode change key causes a modification of the respective character groups associated with a plurality of keys of the keyboard.

15. A computer-readable medium having thereon computer-executable instructions for performing the method according to claim 12.

16. A system for facilitating user input of a character corresponding to a selected language to an electronic device having a hard-key keyboard and a graphical user interface comprising a touch screen display, wherein a selected plurality of keys of the hardware keyboard are each associated with a respective character group comprising at least one character in the selected language, the system comprising:

means for receiving a user selection of a particular key of the selected plurality of keys;

means for displaying on a touch screen display a group of individually user-selectable characters corresponding to the character group associated with the selected particular key;

means for receiving a user selection of a particular user-selectable character on the touch screen display; means for causing entry in the electronic device of the selected particular character; and means for mode selection for causing a modification of the respective character groups associated with a plurality of the selected plurality of keys, wherein modification of the respective character groups associated with a plurality of the selected plurality of keys comprises disassociating respective first character groups from the plurality of the selected plurality of keys and associating respective second character groups with the plurality of the selected plurality of keys, and wherein each of the first character groups corresponds to a first language and each of the second character groups corresponds to a second visual form of the same language.

17. The system according to claim 16, wherein the means for mode selection comprises a key of the hard-key keyboard.

18. The system according to claim 16, wherein each of the first character groups corresponds to a first visual form of a language and each of the second character groups corresponds to a second visual form of the same language.

19. An apparatus for input of a character to an electronic device, the method comprising:

means for displaying an input area within which a plurality of user-selectable input keys are displayed, each input key including a respective candidate character group, each candidate character group comprising at least two visibly displayed candidate characters; and means for displaying a candidate area comprising a group of user-selectable candidate character keys, each candidate character key being correlated to a candidate in a current candidate character group, whereby user selection of an input key in the input area does not subsequently obscure the selected input key but causes the characters of the candidate character group associated with the selected input key to be displayed in the candidate area on respective candidate character keys, and whereby user selection of a candidate character key causes entry in the electronic device of the character associated with the selected candidate character key.

\* \* \* \* \*